United States Patent [19]  [11] Patent Number: 4,941,108
Aoyagi et al.  [45] Date of Patent: Jul. 10, 1990

[54] INTERFACE FOR SENDING PRINTER REQUEST SIGNALS TO A PRINTER

[75] Inventors: Yuuji Aoyagi, Hitachi; Seiji Kageyama, Fuchu, both of Japan

[73] Assignee: Hitachi, Ltd., Tokyo, Japan

[21] Appl. No.: 184,789

[22] Filed: Apr. 22, 1988

[30] Foreign Application Priority Data

May 2, 1987 [JP] Japan .................. 62-109447

[51] Int. Cl.$^5$ .................. G06F 3/12; G06K 15/00
[52] U.S. Cl. .................. 364/519; 364/518; 364/900; 400/65
[58] Field of Search .................. 340/750; 364/200 MS File, 900 MS File, 518, 519, 750; 400/61, 62, 65, 70, 76

[56] References Cited

U.S. PATENT DOCUMENTS

| 3,810,109 | 5/1974 | Morris et al. | 364/200 |
| 4,179,732 | 12/1979 | Khan et al. | 364/200 |
| 4,504,826 | 3/1985 | Leininger | 340/750 |
| 4,520,455 | 5/1985 | Crean et al. | 364/900 |
| 4,525,804 | 6/1985 | Mosier | 364/900 |
| 4,647,982 | 3/1987 | Aoi | 364/518 |

FOREIGN PATENT DOCUMENTS 178870 of 1984 Japan .

Primary Examiner—Gary V. Harkcom
Assistant Examiner—Raymond J. Bayerl
Attorney, Agent, or Firm—Antonelli, Terry, Stout & Kraus

[57] ABSTRACT

Code data is converted to an intermediate code data, the intermediate code data is stored in an intermediate code buffer memory, the intermediate code data is converted to picture element data, the picture element data is stored in a page buffer memory and the picture element data is transmitted to a page printer. After the code data is stored in the intermediate code buffer memory, control code data indicating one page part finishing is received in the intermediate code buffer memory buffer, and the printing process preparation signal is outputted to the page printer. When code data is converted to intermediate code data, a format of the code data is judged, to determine whether a conversion processing from the intermediate code data to the picture element data, corresponding to the code data, requires a processing time which extends beyond a predetermined time limit and if such is true the intermediate code data corresponding to the code data is immediately converted to picture element data and stored in the page buffer memory. A high speed processing time can be obtained. A lifetime decrease in the page printer can be restrained effectively. An improved image output system having a high accuracy and a high reliability can be obtained.

6 Claims, 9 Drawing Sheets

INTERFACE FOR SENDING PRINTER REQUEST SIGNALS TO A PRINTER

BACKGROUND OF THE INVENTION

The present invention relates to an image output system and, more particularly to an improved image output system wherein a high speed processing time in an image output apparatus as a whole can be attained and a lifetime decrease of a printer means of the image output apparatus can be restrained to the utmost. Such an image output apparatus is, for example, an interface controller for use in a laser beam printer.

An external appearance of an image output apparatus in which an image output system is applied to will be explained referring to FIG. 4. In FIG. 4, a data source 1 and an image output apparatus 2 are connected with a signal conductor. The image output apparatus 2 and a page printer 3 as a printer means are connected also with a signal conductor. Such a page printer 3 has one page buffer at the least.

FIG. 5 is a block diagram of an image output apparatus in which a first conventional image output system is adopted, and FIG. 6 is a processing flow-chart of the image output apparatus shown in FIG. 5.

In FIG. 5, the image output apparatus 2 comprises mainly a central processing unit (CPU) 4 and a page buffer memory member 6 in which picture element data 9 having one page part is stored. The central processing unit 4 has a function that a code data 7 received from the data source 1 is developed as the picture element data 9 and the developed picture element data 9 is stored in the page buffer memory member 6. The central processing unit 4 further has a function that the picture element data 9 stored in the page buffer memory member 6 is outputted into the page printer 3.

As shown in FIGS. 5 and 6, the image output apparatus 2 receives the code data 7, for example character code data for one code data part. The character code data is such as an Ascii code or Japanese Industrial Standard (JIS) code etc.. The code data 7 received by the image output apparatus 2 is converted to the picture element data 9, which is an assembly of a plurality of dots, by the central processing unit 4 and stored in the page buffer memory member 6 in order from the forefront. The central processing unit 4 carries out repeatedly these processing operations so far as to receive a control code data which indicates one page part finishing (end).

When one page part development is finished, a printing process preparation signal (PRREQ) 10 is outputted to the page printer 3. When the printing process preparation signal (PRREQ) 10 is outputted, the page printer 3 prepares a printing process. When the preparation for the printing process is completed, a synchronous signal require signal (VSREQ) for requiring a synchronous signal 11 is outputted to the image output apparatus 2 and waits for a synchronous signal (VSYNC) 12 from the image output apparatus 2.

In order to operate the preparation for the printing process, it requires a time of about from several seconds to more than ten seconds in the ordinary page printer When the image output apparatus 2 receives the synchronous signal require signal (VSREQ) 11 from the page printer 3, the synchronous signal (VSYNC) 12 is transmitted to the page printer 3 and a line for one page part of the picture element data 9 in the page buffer memory member 6 is transmitted to the page printer 3 as a printing data signal (VIDEO) 13. Thus, the image output processing for one page part is completed.

FIG. 7 is a block diagram of an image output apparatus which adopts a second conventional image output system different from the image output apparatus shown in FIG. 5. FIG. 8 is various signal timing-charts of the image output apparatus shown in FIG. 7, and FIG. 9 is a processing flow-chart of the image output apparatus shown in FIG. 7.

In FIG. 7, a data source 1 and an image output apparatus 2 are connected with a signal conductor, and also the image output apparatus 2 and a page printer 3 are connected with a signal conductor. The image output apparatus 2 comprises mainly a central processing unit (CPU) 4 and a page buffer memory member 6 for storing picture element data 9 for one page part. The image output apparatus 2 receives code data 7 outputted from the data source 1 as shown in FIGS. 7-9.

Immediately after the image output apparatus 2 receives a first code data (ID) from the data source 1, the printing process preparation signal (PRREQ) 10 is outputted to the page printer 3, thereafter a control code data indicating one page part finishing is developed with the picture element data 9 and stored in the page buffer memory member 6.

When the development processing for one page part is finished, a synchronous signal require signal (VSREQ) 11 is waited for receipt thereof from the page printer 3. After the synchronous signal require signal (VSREQ) 11 is received, a synchronous signal (VSYNC) 12 is transmitted to the page printer 3 and one page part of the picture element data line in the page buffer memory member 6 is transmitted as a printing data signal (VIDEO) 13. Thus, the image output processing for one page part is completed.

According to this second conventional image output system, the printing process preparation processing and the development processing of the code data 7 are carried out together, therefore a high speed processing time of the image output apparatus 2 as a whole can be attained in comparison with the above stated first conventional image output system.

FIG. 10 is a block diagram of an image output apparatus which adopts a third conventional image output system different from the image output apparatus shown in FIG. 5 and FIG. 7, and FIG. 11 is a processing flow-chart of the image output apparatus shown in FIG. 10.

In FIG. 10, a data source 1 and an image output apparatus 2 are connected with a signal conductor, and also the image output apparatus 2 and a page printer 3 are connected with a signal conductor. The image output apparatus 2 comprises mainly a central processing unit (CPU) 4, an intermediate code buffer memory member 5, and a page buffer memory member 6.

The central processing unit 4 functions that code data 7 is received from the data source 1 and converted to intermediate code data 8, the intermediate code data 8 is converted to picture element data 9, and further the picture element data 9 is outputted into the page printer 3. The intermediate code buffer memory member 5 stores the intermediate code data 8 which is converted from the code data 7 by the central processing unit 4. The page buffer memory member 6 stores the picture element data 9 which is converted from the intermediate code data 8 by the central processing unit 4.

In FIGS. 10 and 11, when the image output apparatus 2 receives the code data 7 from the data source 1, the code data 7 is converted to the intermediate code data 8 by the central processing unit 4 and stored in the intermediate code buffer memory member 5. These processes are carry out repeatedly so far as to receive a control code data which indicates one page part finishing of the transmitted code data 7.

After the picture element data 9 for a previous page part, which is one page part just before a present page, received in the page buffer memory member 6 is outputted to the page printer 3, the intermediate code data 8 for one page part is converted to the picture element data 9. After the picture element data 9 is stored in the page buffer memory member 6, the printing process preparation signal (PRREQ) 10 is outputted to the page printer 3. The subsequent processing is carried out similar to the above stated first conventional image output system.

According to this third image output system, in case of continuous plural pages printing, even if the picture element data 9 for the previous page part, which is one page part just before the present page part, is not inputted and remains still in the page buffer memory member 6, the code data 7 for the present page part can be developed and processed as the intermediate code data 8 which is a code data just before being converted as the picture element data 9.

In case of the picture element data 9 for the previous page part received in the page buffer memory member 6 is outputted to the page printer 3, it is possible to develop promptly the code data 7 for the present page part as the picture element data 9. Therefore a high speed processing time of the third conventional image output system as a whole during a continuous printing can be attained in comparative with the above stated first conventional image output system.

However, in the first conventional image output system, the development processing of the code data 7 outputted from the data source 1 and the printing process preparation processing of the page printer 3 carries out entirely to be in a row, so that there is problem that a long time processing in the image output apparatus 2 as a whole is required.

In case of the above stated second conventional image output system, the printing process preparation processing in the page printer 3 and the development processing of the code data 7 in the image output apparatus 2 can carry out together, however, when a data transfer frequency from the data source 1 is low or the control code data indicating one page part finishing does not reach, the page printer 3 must wait for a long time keeping at the printing process preparation condition.

The page printer 3 may adopt commonly an electro-photo system as a printing method. When the electro-photo system is adopted as the printing method, under the printing process preparation condition, the discharge breakdown action by the corona discharge, the friction action by the cleaning mechanism, and the light fatigue action by the photo-scanning remain to be added to the electro-photosensitivity member being as a heat portion in the page printer 3, therefore there is problem that the lifetime of the electro-photosensitivity member becomes short remarkably.

Further, in the third conventional image output system, under the continuous plural pages printing, even if the picture element data 9 for the previous page part is not inputted and remains still in the page buffer memory member 5, the code data 7 for the present page part can be developed and processed as the intermediate code data 8 which is a code data just before being converted as the picture element data 9. When the picture element data 9 for the previous page part received in the page buffer memory member 5 is outputted, the code data 7 for the present page part can be developed promptly as the picture element data 9.

However, the development processing of the code data 7 and the printing process preparation processing carry out entirely to be in a row, so that there is problem that a long time processing in the image output apparatus 2 as a whole is required. Therefore, a high speed processing time in the image output apparatus 2 is obstructed.

Such a conventional technique about the image output system is shown in, for example in Japanese Patent Laid-Open No. 178870/1984.

SUMMARY OF THE INVENTION

An object of the present invention is to provide an image output system wherein a high speed processing time in an image output apparatus as a whole can be obtained.

Another object of the present invention is to provide an image output system wherein a lifetime decrease of a printer means in an image output apparatus can be restrained effectively.

A further object of the present invention is to provide an image output system wherein an image output apparatus having a high accuracy and a high reliability can be obtained.

A still further object of the present invention is to provide an image output system wherein a data for a present page part can be converted promptly as a picture element data.

A further yet object of the present invention is to provide an image output system wherein a development processing for developing from code data to picture element data and a printing process preparation processing can be carried out together.

A still further yet object of the present invention is to provide an image output system wherein a printer apparatus of an image output apparatus can be constructed not to wait for for a long time keeping with under a printing process preparation condition.

A still yet another object of the present invention is to provide an image output system wherein an image data code can be developed directly in a page buffer memory member.

In accordance with the present invention, in an image output system wherein code data transmitted from a data source is converted to intermediate code data, the intermediate code data is stored in an intermediate code buffer memory member, and the intermediate code data is converted to picture element data. The picture element data is transmitted to a printer means along with a printing process preparation signal.

After the code data transmitted from the data source is converted to the intermediate code data and stored in the intermediate code buffer memory member, a control code data indicating one page part finishing is received in the intermediate code buffer memory buffer member, and the printing process preparation signal is outputted to the printer means in company with a processing in which the intermediate code data is developed to the picture element data.

When the code data transmitted from the data source is converted to the intermediate code data, then a type or kind of the code data is judged. When a development processing from the intermediate code data to the picture element data is discriminated to require a comparative long processing time, then the intermediate code data, which has been stored already in the intermediate code buffer memory member, and the code data are developed picture element data and stored in a page buffer memory member. When a control code data indicating one page part finishing is received in the page buffer memory member, then the printing process preparation signal is outputted to the printer means.

According to the present invention, the code data transmitted from the data source is converted to the intermediate code data, and intermediate code data is stored in the intermediate code buffer memory member. When a control code data, which indicates one page part finishing to the intermediate code buffer memory member, is received, the printing process preparation signal is outputted to the page printer along with the development processing of the intermediate code data to the picture element data.

In case of the continuous plural pages printing, even if the picture element data for a previous page part, which is one page part just before a present page part, is not outputted and remains in the page buffer memory member, the code data for the present page part can be developed and processed as the intermediate code data which is a code data immediately before being converted as the picture element data. When the picture element data for the previous page part stored in the page buffer memory member is outputted, the code data for the present page part can be developed promptly as the picture element data. A high speed processing time of the image output apparatus as a whole can be attained. Further, the development processing of the code data to the picture element data and the printing process preparation processing in the page printer can be carried out together, thereby a high speed processing time of the image apparatus as a whole can be attained also.

According to the present invention, unless the control code data or control signal indicating one page part finishing with the intermediate code buffer memory member is received, the printing process preparation signal is not outputted to the page printer, so that even if the data transfer frequency from the data source is low or the control code data indicating one page part finishing from the data source does not reach, the inconvenience that the page printer waits for a long time keeping with under the printing process preparation condition can be restrained to the utmost.

According to the present invention, the inconvenience can be prevented from the addition of the discharge breakdown action caused by the corona discharge, the friction action caused by the cleaning mechanism, and the light fatigue action caused by the photoscanning. Therefore the lifetime lowering of the electro-photosensitivity member can be restrained to the utmost because of no occurrence of the above stated inconvenience in the image output apparatus.

The code being transmitted from the data source includes generally a character code corresponding to a character, a graphic code corresponding a graphic form such as a line, a circle etc., an image data code corresponding to the image display apparatus as a data source, and a control code for controlling the image output apparatus etc..

The development processing for one code in the graphic code requires almost a large area and bit processing in comparison with that of the character code, thereby the developement processing time requires also about from several hundreds to several thousands time that of the character code.

Further, in case of the image code, the data content of one code of the image code is considered to be as a primitive information having a dot or a line in comparison with the character code, so that the development processing time is much the same as that of the character code. However, for transmitting the information amount having a predetermined area, the image data code requires about from several tens to several hundreds code numbers in comparison with that of the character data, as a result the total processing time requires about from several hundreds to several thousands time that of the character data.

According to the present invention, when the code data from the data source is converted to the intermediate code data, the type or kind of the code data is judged.

As a result, when the code data is discriminated that it requires a comparative long processing time for the development processing from the intermediate code data to the picture element data, the intermediate code data, which has been stored already in the intermediate code buffer memory member, including the code data is developed in the picture element data and stored in the page buffer memory member.

Further, after the control code for indicating one page part finishing with the page buffer memory member is received, the printing process preparation signal is outputted to the page printer.

According to the present invention, the code data, which requires a long time development processing, is inputted, the page printer needs not wait for a long time keeping with under the printing process preparation condition, the lifetime decrease of the electro-photosensitivity member of the page printer can be restrained effectively.

Further, according to the present invention, the image data code having a large amount of information is not converted to the intermediate code but developed directly in the page buffer memory member, so that the memory capacity of the intermediate code buffer memory member can be reduced.

According to the present invention, a high speed processing time in the image output apparatus as a whole can be obtained. Further, a lifetime decrease in the printer means of the image output apparatus can be restrained effectively. Thereby, an improved image output system having a high accuracy and a high reliability can be obtained.

DESCRIPTION OF THE INVENTION

Figure 1:
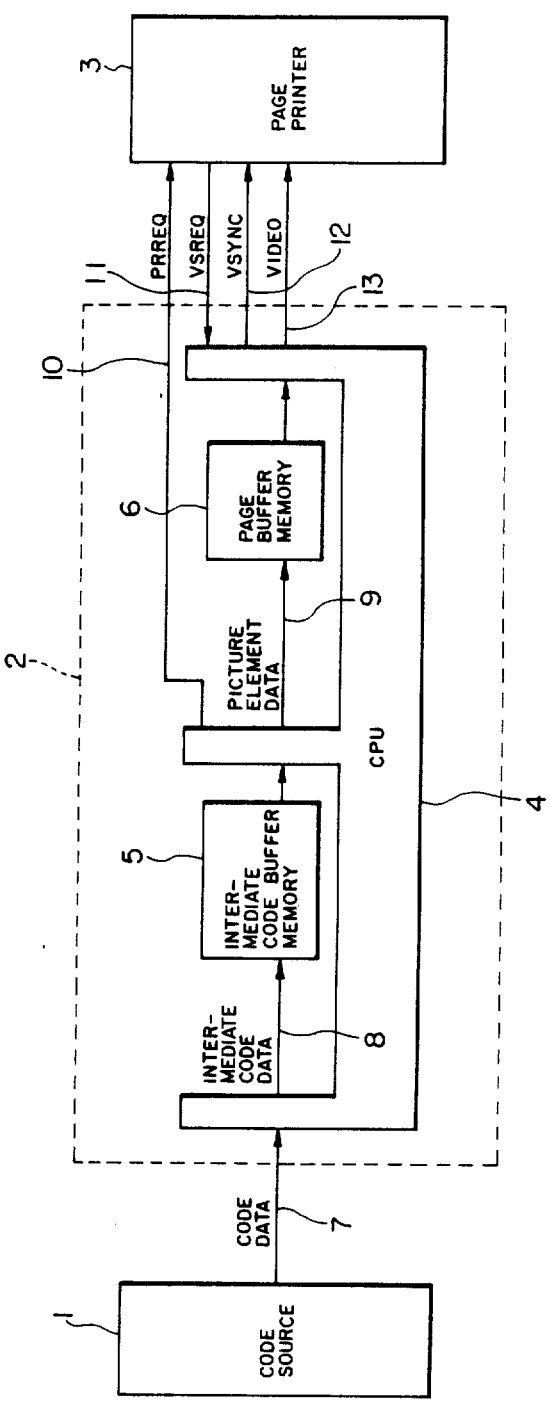
FIG. 1 is a block diagram in which an image output apparatus adopts an image output system according to one embodiment of the present invention.
Figure 2:
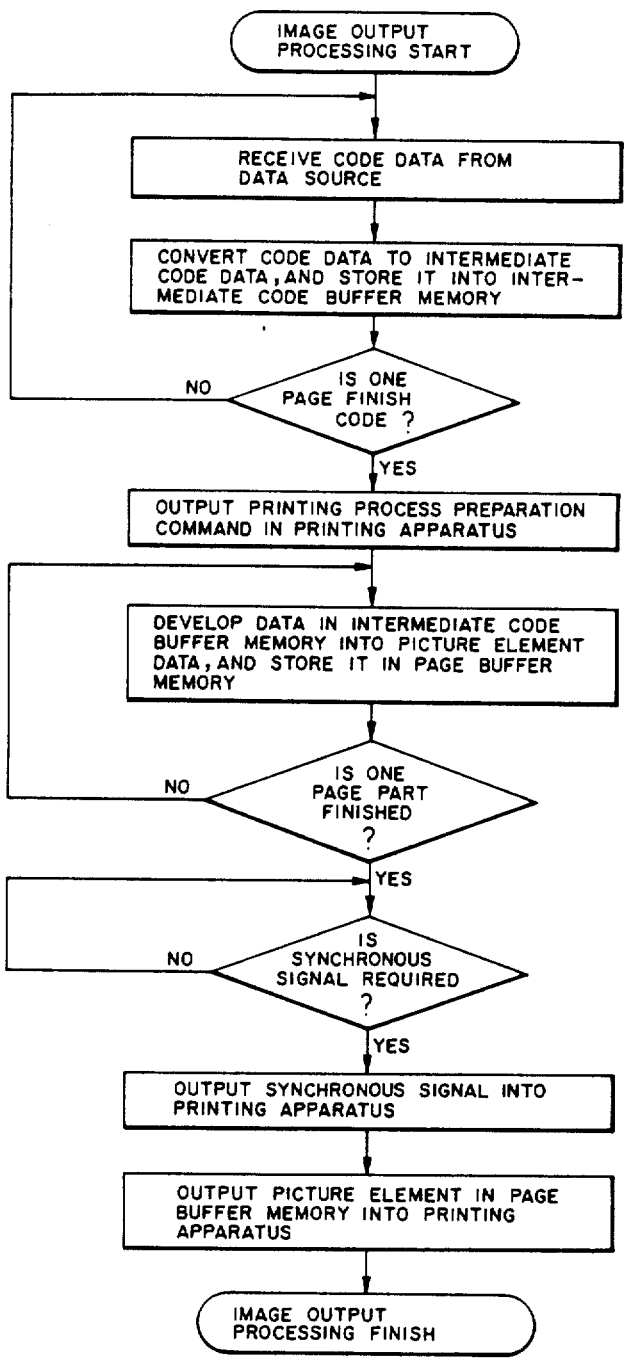
FIG. 2 is a processing flow-chart of the image output apparatus shown in FIG. 1.

One embodiment of an image output system according to the present invention will be explained referring to FIGS. 1 and 2. FIG. 1 is a block diagram in which an image output apparatus adopts an image output system according to present invention, and FIG. 2 is a processing flow-chart of the image output apparatus shown in FIG. 1.

In FIG. 1, a data source 1 and an image output apparatus 2 are connected with a signal conductor, and also the image output apparatus 2 and a page printer 3 are connected with a signal conductor. The image output apparatus 2 comprises mainly a central processing unit (CPU) 4, an intermediate code buffer memory member 5, and a page buffer memory member 6.

The central processing unit 4 functions that a code data 7 is received from the data source 1 and converted to as an intermediate code data 8, the intermediate code data 8 is converted to as a picture element data 9, and further the picture element data 9 is outputted into the page printer 3.

The intermediate code buffer memory member 5 stores the intermediate code data 8 which is converted from the code data 7 by the central processing unit 4. The page buffer memory member 6 stores the picture element data 9 which is converted from the intermediate code data 8 by the central processing unit 4.

The transmitting procedure of a printing data from the page buffer memory member 6 to the page printer 3 will be explained as follows.

When a printing process preparation signal (PRREQ) 10 is transmitted from the image output apparatus 2, at the page printer 3 side, the preparation for a printing process is commenced. Such a preparation for the printing process is practised by the driving of a motor, the drawing up a recording paper from a recording paper receiving cassette, and the charging of the electrophotosensitivity member etc..

After the completion of the printing process preparation, a synchronous signal require signal (VSREQ) 11 is transmitted to the image output apparatus 2. When the synchronous signal require signal (VSREQ) 11 from the page printer 3 is received in the image output apparatus 2, a synchronous signal (VSYNC) 12 is transmitted to the page printer 3 and the picture element data 9 stored in the page buffer memory member 6 are transmitted respectively to the page printer 3 as a printing data signal (VIDEO) 13.

The page printer 3 commences the printing process in synchronization with the synchronous signal (VSYNC) 12 transmitted from the image output apparatus 2. The page printer 3 prints the contents of the printing data signal (VIDEO) 13 transmitted from the image output apparatus 2.

In FIGS. 1 and 2, when the image output apparatus 2 receives the code data 7 from the data source 1, the code data 7 is converted to the intermediate code data 8 by the central processing unit 4 and the intermediate code data 8 is stored in the intermediate code buffer memory member 5. These processing operations carries out repeatedly so far as to change a control code data which indicates one page part finishing of the transmitted code data 7.

In the central processing unit 4, as of time that the code data 7 for one page part is finished to convert the intermediate code data 8, the printing process preparation signal (PRREQ) 10 is outputted to the page printer 3. While the page printer 3 carries out the preparation for the printing process, in the image output apparatus 2 the intermediate code data 8 for one page part is converted to the picture element data 9, and the picture element data 9 is stored in the page buffer memory member 6.

After that in the image output apparatus 2, the receiving of the synchronous signal require signal (VSREQ) 11 from the page printer 3 is waiting for. After the receiving of the synchronous signal require signal (VSREQ) 11, a printing data signal 13 and the synchronous signal (VSYNC) 12 are inputted to the page printer 3. Thus the image output processing is completed.

According to one embodiment of the present invention, the code data 7 is transmitted from the data source 1 is converted to the intermediate code data 8, and intermediate code data 8 is stored in the intermediate code buffer memory member 5. When a control code data, which indicates one page part finishing to the intermediate code buffer memory member 5, is received, the printing process preparation signal (PRREQ) 10 is outputted to the page printer 3 in company with the development processing of the intermediate code data 8 to the picture element data 9.

In case of the continuous plural pages printing, even if the picture element data 9 for a previous page part, which is one page part just before a present page part, is not outputted and remains in the page buffer memory member 6, the code data 7 for the present page part can be developed and processed as the intermediate code data 8 which is a code data immediately before being converted as the picture element data 9. When the picture element data 9 for the previous page part stored in the page buffer memory member 6 is outputted, the code data 7 for the present page part can be developed promptly as the picture element data 9.

A high speed processing time of the image output apparatus 2 as a whole can be attained Further, the development processing of the code data 7 to the picture element data 9 and the printing process preparation processing in the page printer 3 can be carried out together, thereby a high speed processing time of the image output apparatus 2 as a whole can be attained also.

According to one embodiment of the present invention, unless the control code data or control signal indicating one page part finishing with the intermediate code buffer memory member 5 is received, the printing process preparation signal (PRREQ) 10 is not outputted to the page printer 3, so that even if the data transfer frequency from the data source 1 is low or the control code data indicating one page part finishing from the data source 1 does not reach, the inconvenience that the page printer 3 waits for a long time keeping with under the printing process preparation condition can be restrained to the utmost.

According to one embodiment of the present invention, such an inconvenience can be prevented from the addition of the discharge breakdown action caused by the corona discharge, the friction action caused by the cleaning mechanism, and the light fatigue action by the photo-scanning. Therefore a lifetime lowering of the electro-photosensitivity member can be restrained to the utmost because of no occurrence of the above stated inconvenience in the image output apparatus 2.

A second embodiment of the image output system according to the present invention will be explained referring to the drawing.

Figure 3:
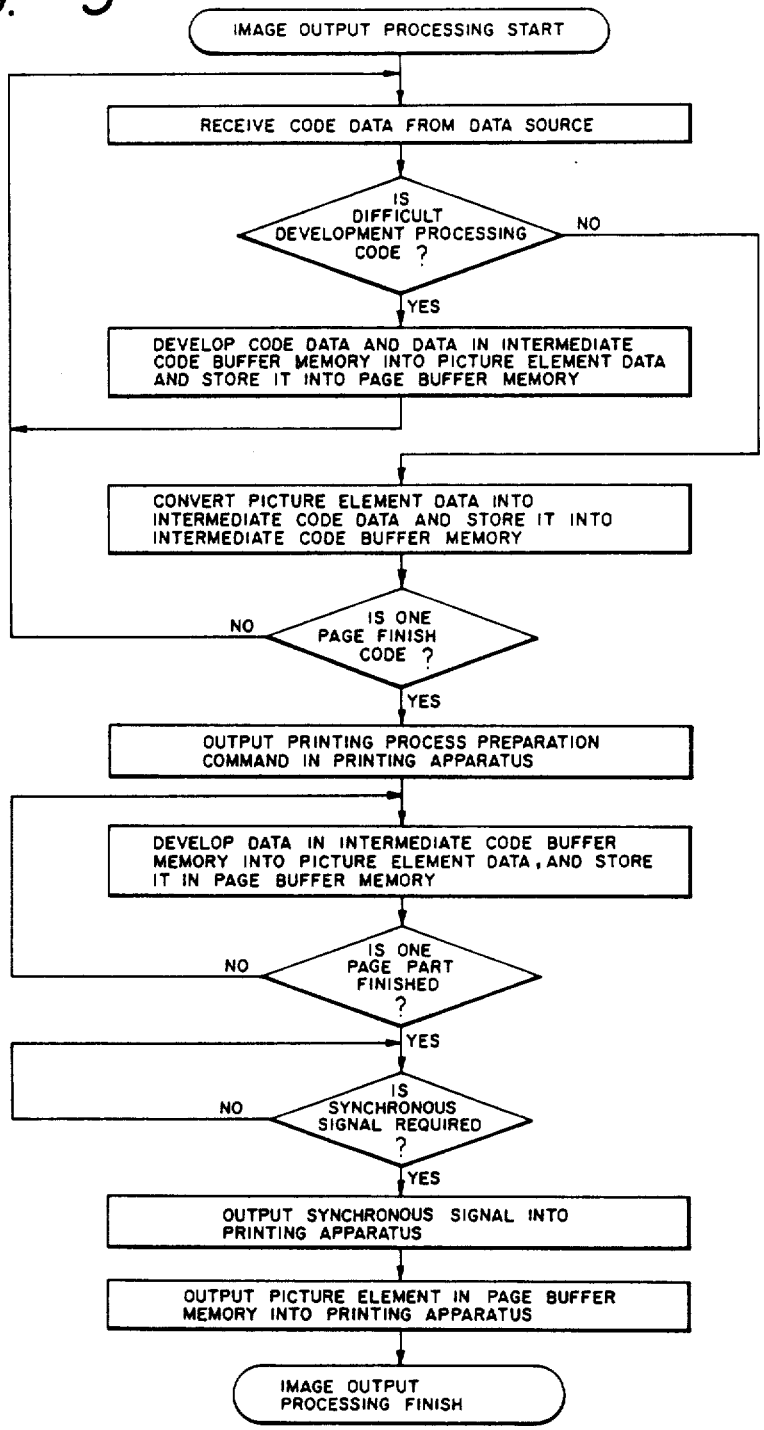
FIG. 3 is a processing flow chart in which an image output apparatus adopts an image output system according to another embodiment of the present invention.
Figure 4:
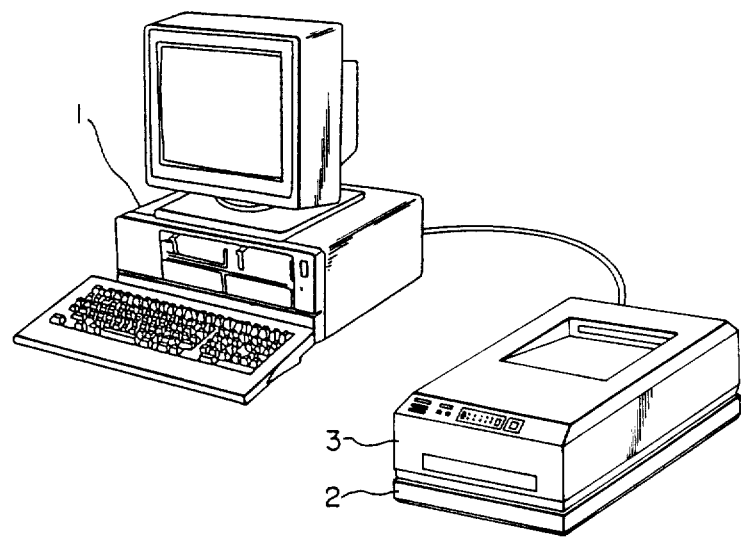
FIG. 4 is an external appearance of the image output apparatus.
Figure 5:
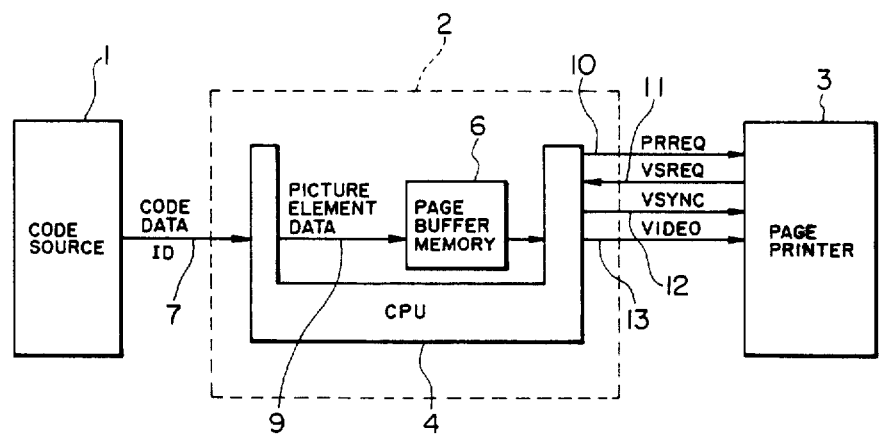
FIG. 5 is a block diagram in which an image output apparatus adopts a first conventional image output system.
Figure 6:
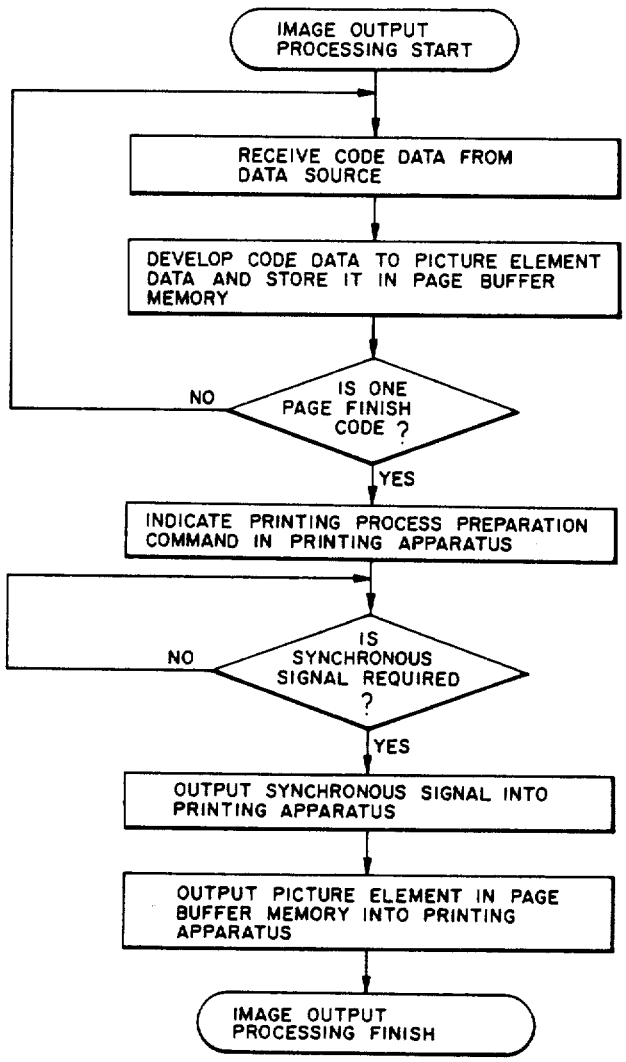
FIG. 6 is a processing flow-chart of the image output apparatus shown in FIG. 5.
Figure 7:
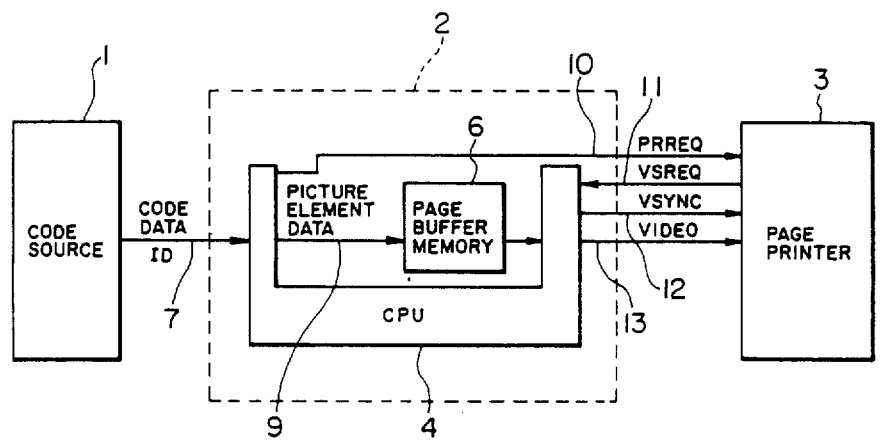
FIG. 7 is a block diagram in which an image output apparatus adopts a second conventional image output system.
Figure 8:
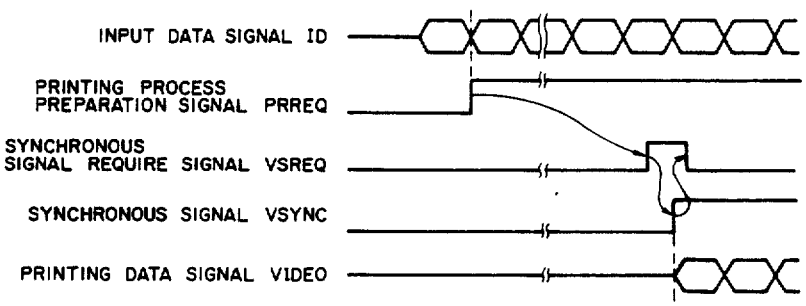
FIG. 8 is various signal timing-charts of the image output apparatus shown in FIG. 7.
Figure 9:
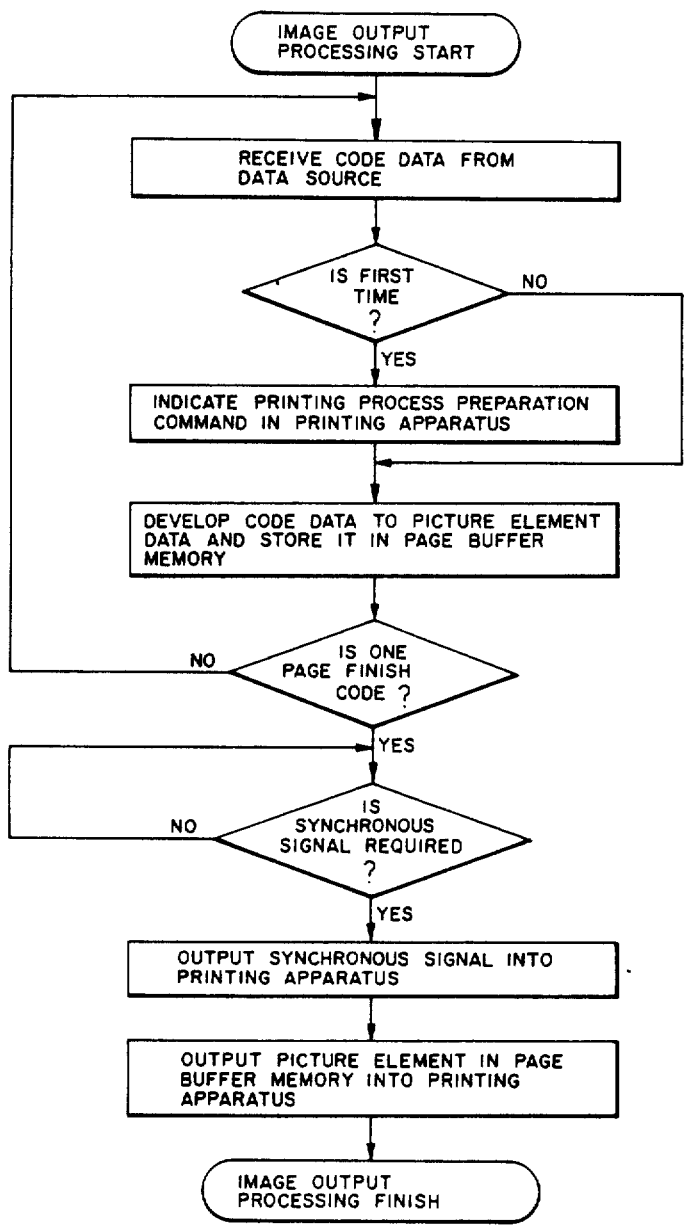
FIG. 9 is a processing flow-chart of the image output apparatus shown in FIG. 7.
Figure 10:
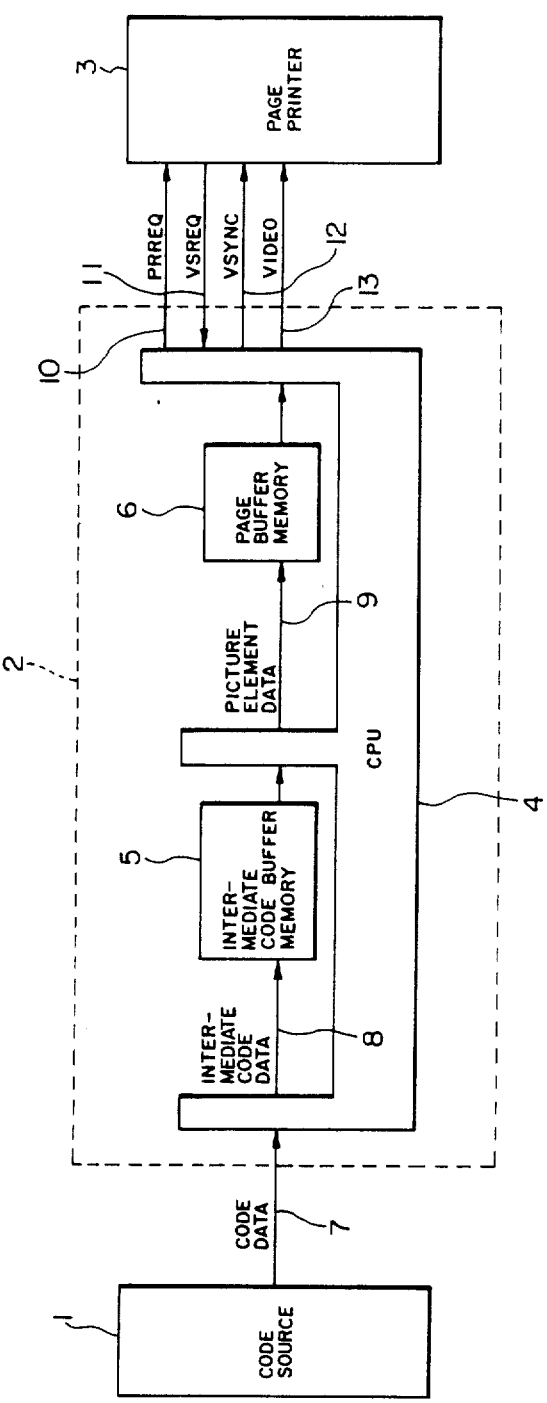
FIG. 10 is a block diagram in which an image output apparatus adopts a third conventional image output system.
Figure 11:
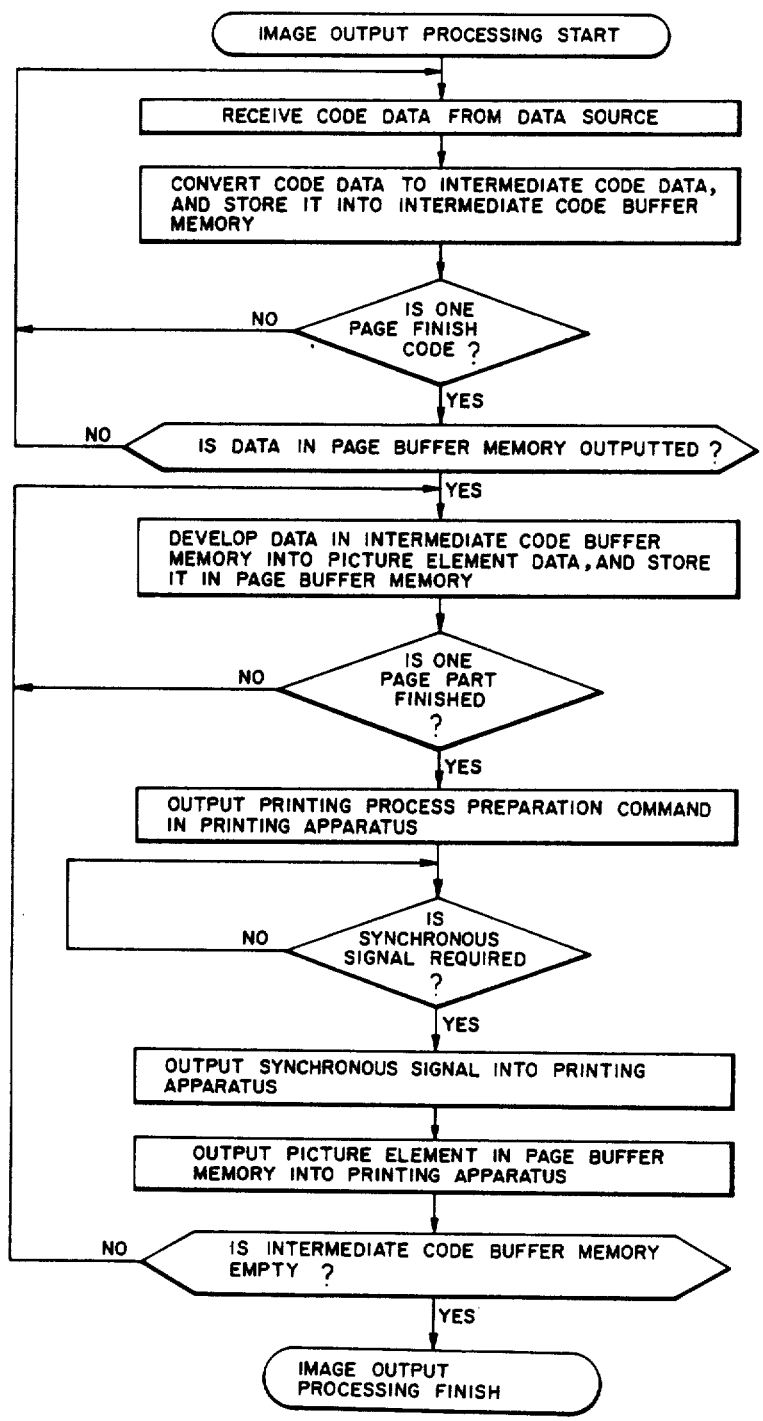
FIG. 11 is a processing flow-chart of the image output apparatus shown in FIG. 10.

In FIG. 3, a total structure of an image output apparatus 2 is similar to that of the first embodiment of the present invention shown in FIG. 1. In this second embodiment of the present invention, when a code data 7 from a data source 1 is converted to an intermediate code data 8, a type or kind of the intermediate code data 8 is judged.

As a result, when the development processing from the intermediate code data 8 to a picture element data 9 is required a comparative long processing time, the intermediate code data 8, which has stored already in an intermediate code buffer memory member 5, including the code data 7 is developed in the picture element data 9 and stored in a page buffer memory member 6.

Namely, in the second embodiment of the present invention, the code data 7 from the data source 1 is classified to a character code, a graphic code, an image data code, or a control code etc.. The graphic code requires several hundreds or several thousands processing time in comparison with the development of the character code. The image data code requires a large amount of the buffer memory for storing the information having a predetermined area.

When the code data 7 is the graphic code or the image data code, such a code is regarded as a difficult development processing code. Such a difficult development processing code is not converted to as the intermediate code data 8 but is converted directly to as the picture element data 9. The converted picture element data 9 including the intermediate code data 8, which has been stored already in the intermediate code buffer memory member 5, is stored in the page buffer memory member 6. The subsequent processing operations are similar to that of the above stated first embodiment of the present invention.

According to the second embodiment of the present invention, when the code data 7 from the data source 1 is converted to the intermediate code data 8, the type or kind of the code data 7 is judged.

As a result, when the code data 7 is discriminated that it requires a comparative long processing time for the development processing from the intermediate code data 8 to the picture element data 9, the intermediate code data 8, which has been stored already in the intermediate code buffer memory member 5, including the code data 8 is developed to picture element data 9 and stored in the page buffer memory member 6.

Further, after the control code data for indicating one page part finishing with the page buffer memory member 6 is received, the printing process preparation signal (PRREQ) 10 is outputted to the page printer 3.

Therefore, according to the second embodiment of the present invention, the code data 7, which requires a long time development processing, is inputted, the page printer 3 needs not wait for a long time keeping with under the printing process preparation condition, a lifetime decrease of the electro-photosensitivity member of the page printer 3 can be restrained effectively.

Further, according to the second embodiment of the present invention, the image data code having a large amount of information is not converted to the intermediate code but developed directly in the page buffer memory member 6, so that the memory capacity of the intermediate code buffer memory member 5 can be reduced.

We claim:

1. In a printer interface system or sending a printer request signal to printer means wherein code data transmitted from a data source is converted to intermediate code data, said intermediate code data being stored in an intermediate code buffer memory member, and said intermediate code data being converted to picture element data, said picture element data being stored in a page buffer memory member, and said picture element data being transmitted from said page buffer memory member to an printer means in company with a printing process preparation signal, an improvement comprising:

wherein after said code data transmitted from said data source is converted to said intermediate code data and stored in said intermediate code buffer memory member, wherein a format of said code data is judged to determine whether a conversion processing of said corresponding intermediate code data to said picture element data requires a processing time which extends beyond a predetermined time limit, wherein a control code data, supplied by said data source and indicating one page part finishing is converted to intermediate code data and stored in said intermediate code buffer memory member, and said printing process preparation signal is outputted to said printer means in company with a processing in which said intermediate code data is converted to said picture element data.

2. In a printer interface system for sending a printer request signal to printer means wherein code data transmitted from a data source is converted to intermediate code data, said intermediate code data being stored in an intermediate code buffer memory member, and said intermediate code data being converted to picture element data, said picture element data being stored in a page buffer memory member, and said picture element data being transmitted from said page buffer memory member to said printer means in company with a printing process preparation signal, an improvement comprising:

wherein when said code data transmitted from said data source is converted to corresponding intermediate code data, a format of said code data is judged to determine whether a conversion processing of said corresponding intermediate code data to said picture element data requires a processing time which extends beyond a predetermined time limit and if said determination is judged to be true said corresponding intermediate code data is immediately converted into picture element data and stored in said page buffer memory member, otherwise said corresponding intermediate code data is stored in said intermediate code buffer memory member and later converted to said picture element data and stored in said page buffer memory member; and wherein when control code data, supplied by said data source and indicating one page part finishing, is converted and stored in said intermediate code buffer memory member, said printing process preparation signal is outputted to said printer means in company with a processing in which said intermediate code data is converted to said picture element data.

3. In a printer interface system for sending a printer requests signal to printer means wherein code data transmitted from a data source is converted to intermediate code data, said intermediate code data being stored in an intermediate code buffer memory member, and said intermediate code data is converted to picture element data, said picture element data being stored in a page buffer memory member, and said picture element data being transmitted from said page buffer memory member to said printer means in company with a printing process preparation signal, an improvement comprising:

wherein after said code data transmitted from said data source is converted to said intermediate code data and stored in said intermediate code buffer memory member, a control code data indicating one page part finishing is sent from said data source, connected to intermediate code data and is stored in said intermediate code buffer memory member, and said printing process preparation signal is outputted to said printer means in company with a processing in which said intermediate code data is converted to said picture element data; and wherein, when said code data transmitted from said data source is converted to corresponding intermediate code data, a format of said code data is judged to determine whether a conversion processing of said intermediate code data to said picture element data requires a processing time which extends beyond a predetermined time limit and if said determination is judged to be true said corresponding intermediate code data is immediately converted to picture element data and stored in said page buffer memory member, otherwise, said corresponding intermediate code data is stored in said intermediate code buffer memory member and later converted to said picture element data and stored in said page buffer memory member; and wherein when said control code data supplied by said data source and indicating one page intermediate code finishing is converted and stored in said page buffer memory member, said printing process preparation signal is outputted to said printer means in company with a processing in which intermediate code data is converted to said picture element data.

4. A printer interface system for sending a printer request signal to printer means, wherein said printer interface system receives code data transmitted from a data source, and outputs picture element data to said printer means, said printer interface system including a central processing unit for receiving said code data, an intermediate code buffer memory member for storing intermediate code data converted from said code data by said central processing unit, and a page buffer memory member for storing said picture element data converted from said intermediate code data by said central processing unit, said central processing unit outputs said picture element data to said printer means, said picture element data being output to said printer means in company with a printing process preparation signal, an improvement comprising:

wherein after said code data transmitted from said data source is converted to said intermediate code data and stored in said intermediate code buffer memory member, wherein a format of said code data is judged to determine whether a conversion processing of said corresponding intermediate code data to said picture element data requires a processing time which extends beyond a predetermined time limit, wherein a control code data indicating one page part finishing is sent from said data source, connected to intermediate code data and stored in said intermediate code buffer memory member, and said printing process preparation signal is outputted to said printer means in company with a processing in which said intermediate code data is converted to said picture element data.

5. A printer interface system for sending a printer request signal to printer means, wherein said printer interface system receives code data transmitted from a data source and outputs picture element data to said printer means, said printer interface system including a central processing unit for receiving said code data, an intermediate code buffer memory member for storing intermediate code data converted from said code data by said central processing unit, and a page buffer memory member for storing said picture element data converted from said intermediate code data by said central processing unit, said central processing unit outputs said picture element data to said printer means, said picture element data being output to said printer means in company with a printing process preparation signal, an improvement comprising:

wherein when said code data transmitted from said data source is converted to corresponding intermediate code data, a format of said code data is judged to determine whether a conversion processing of said corresponding intermediate code data to said picture element data requires a processing time which extends beyond a predetermined time limit and if said determination is judged to be true said corresponding intermediate code data is immediately converted to picture element data and stored in said page buffer memory member, otherwise, said corresponding intermediate code data is stored in said intermediate code buffer memory member and later converted to said picture element data and stored in a page buffer memory member; and wherein when a control code data supplied by said data source indicating one page part finishing is converted and stored in said intermediate code buffer memory member, said printing process preparation signal is outputted to said printer means in company with a processing in which intermediate code data is converted to said picture element data.

6. A printer interface system for sending a printer request signal to printer means, wherein said printer interface system receives code data transmitted from a data source and outputs picture element data to said printer means, said printer interface system including a central processing unit for receiving said code data, an intermediate code buffer memory member for storing intermediate code data converted from said code data by said central processing unit, and a page buffer memory member for storing said picture element data converted from said intermediate code data by said central processing unit, said central processing unit outputs said picture element data being output to said printer means, said picture element data being output to said printer means in company with a printing process preparation signal, an improvement comprising:

wherein after said code data transmitted from said data source is converted to said intermediate code data and stored in said intermediate code buffer memory member, a control code data indicating one page part finishing is sent from said data source, connected to intermediate data and stored inputted in said intermediate code buffer memory member said printing process preparation signal is outputted to said printer means in company with a processing in which said intermediate code data is converted to said picture element data; and wherein when said code data transmitted from said data source is converted to corresponding intermediate code data, a format of said code data is judged to determine whether a conversion processing of said corresponding intermediate code data to said picture element data requires a processing time which extends beyond a predetermined time limit and if said determination is judged to be true, said corresponding intermediate code data is immediately converted to picture element data and stored in said page buffer memory member, otherwise, said corresponding intermediate code data is stored in said intermediate code buffer memory member and later converted to said picture element data and stored in said page buffer memory member, wherein when said control code data supplied by said data source indicating one page part finishing is converted and stored in said intermediate code buffer memory member, said printing process preparation signal is outputted to said printer means in company with a processing which intermediate code data is converted to said picture element data.

* * * * *